(12) United States Patent
Grob et al.

(10) Patent No.: US 6,881,769 B1
(45) Date of Patent: Apr. 19, 2005

(54) MATTING AGENTS FOR THERMALLY CURABLE SYSTEMS

(75) Inventors: Carmelina Grob, Riehen (CH); Christoph Rickert, Reinach (CH); Daniel Künzi, Basel (CH)

(73) Assignee: Huntsman Advanced Materials Americas Inc., Brewster, NY (US)

( * ) Notice: Subject to any disclaimer, the term of this patent is extended or adjusted under 35 U.S.C. 154(b) by 0 days.

(21) Appl. No.: 09/937,001

(22) PCT Filed: Mar. 7, 2000

(86) PCT No.: PCT/EP00/01967

§ 371 (c)(1),
(2), (4) Date: Sep. 19, 2001

(87) PCT Pub. No.: WO00/56821

PCT Pub. Date: Sep. 28, 2000

(30) Foreign Application Priority Data

Mar. 19, 1999 (CH) .............................................. 529/99
Dec. 21, 1999 (CH) .............................................. 2342/99

(51) Int. Cl.$^7$ ............................. C08K 3/24; C08K 3/26; C08L 91/06
(52) U.S. Cl. ...................... 523/457; 523/400; 523/427; 523/465; 524/904
(58) Field of Search ................................ 524/475, 277, 524/302, 392, 399–400, 487–488, 904, 275; 523/400, 427, 457, 465

(56) References Cited

U.S. PATENT DOCUMENTS

| | | | |
|---|---|---|---|
| 4,614,674 A | 9/1986 | Lauterbach | 427/386 |
| 5,470,893 A | * 11/1995 | Sinclair-Day et al. | 523/205 |
| 5,472,649 A | * 12/1995 | Chang et al. | 264/15 |
| 5,525,370 A | 6/1996 | Hoebeke et al. | 427/195 |
| 5,536,785 A | * 7/1996 | Foukes et al. | 525/176 |
| 5,856,378 A | 1/1999 | Ring et al. | 523/205 |
| 6,069,221 A | * 5/2000 | Chasser et al. | 528/26 |

FOREIGN PATENT DOCUMENTS

| | | |
|---|---|---|
| EP | 0 165 207 A1 | 12/1985 |
| EP | 0 676 420 A2 | 10/1995 |
| EP | 0 755 986 A2 | 1/1997 |

* cited by examiner

Primary Examiner—Peter Szekely
(74) Attorney, Agent, or Firm—Proskauer Rose LLP

(57) ABSTRACT

Matting agent for thermally curable systems, especially for powder coating compositions, that comprise at least, one carboxyl-containing polymer as binder and at least one epoxy-group-containing compound as cross-linking agent, wherein the matting agent comprises at least the following constituents: (a) a metal salt or a metal complex of an organic compound, the metal being selected from the group magnesium, calcium, strontium, barium, zinc, aluminium, tin and antimony, and (b) a polymerisation product of monomers, the monomers including epoxy-group-containing monomers and the epoxy value of the polymerisation product being from 0.1 to 8 equivalents of epoxy groups, and overall the ratio of epoxy equivalents of component (b) to metal equivalents of component (a) being from 0.2 to 120.

28 Claims, No Drawings

MATTING AGENTS FOR THERMALLY CURABLE SYSTEMS

The present invention relates to matting agents for thermally curable systems, especially surface-coating compositions, preferably powder coating compositions, which comprise at least one carboxyl-containing polymer, for example a carboxyl-terminated polyester and/or a carboxyl-containing (meth)acrylate polymer, as binder and at least one epoxy-group-containing compound as hardener or cross-linking agent and, optionally, an accelerator for the cross-linking reaction of the hardener with the carboxyl-containing polymer and also further additives that are customary per se.

For the purposes of the present Application, the said thermally curable systems are divided into two main groups, namely into glycidyl-ester-free systems, which in this Application are understood to be systems in which the cross-linking agents do not include glycidyl ester compounds having a molecular weight of up to and including 1500, and into thermally curable systems in which the cross-linking agents do include such glycidyl ester compounds. The glycidyl-ester-free systems include especially the so-called hybrid systems, which comprise a polymeric epoxy compound, e.g. an advanced diglycidyl ether of bisphenol, as cross-linking agent, and also thermally curable systems that comprise triglycidyl isocyanurate (TGIC) as cross-linking agent. Thermally curable systems that comprise glycidyl ester compounds having a molecular weight of up to and including 1500 as cross-linking agents are, for example, systems based on a polyglycidyl ester of an aromatic, aliphatic or cycloaliphatic polycarboxylic acid as cross-linking agent, for example Araldite PT 910, which is a solid mixed phase consisting of one part by weight of triglycidyl trimellitate and three parts by weight of diglycidyl terephthalate.

Matting agents for the said thermally curable systems, especially for corresponding powder coating compositions, are already known. Those matting agents generally consist of a natural or synthetic wax, for example carnauba wax, shellac wax or paraffin wax. Together with such waxes, there may be used, furthermore, metal salts and/or metal complexes of organic compounds, preferably of magnesium, calcium, aluminium or zinc, with preference being given to the use of zinc 2-benzothiazole thiolate (zinc mercaptobenzothiazole). Such matting agents are described, for example, in EP 0 165 207. By means of a matting agent of that kind, which contains, for example, approximately from 10 to 15% zinc 2-benzothiazole thiolate and approximately from 90 to 85% polyethylene wax, it is possible, for example, to reduce the gloss of powder coatings compositions comprising a glycidyl-ester-free thermally curable system as described above to a gloss index of from 30 to 100, depending on the amount added, without the mechanical properties being adversely affected.

The use of such high-wax-content matting agents is, however, usually undesirable, especially in relatively high concentrations, because they generally result in surfaces exhibiting an undesirable haze effect. Furthermore, the use of matting waxes is generally restricted to light colours. In addition, the presence of wax on the surface frequently causes severe adhesion problems (for example in the case of window frames), so that further material does not adhere adequately to a first layer of material, which cannot, therefore, be coated further.

Furthermore, in thermally curable systems based on low-molecular-weight glycidyl ester compounds as cross-linking agents, the action of conventional matting agents is not satisfactory with respect to gloss reduction and mechanical properties. For example, it is generally possible to reduce the gloss of such systems only to an index of from 70 to 100 without impairing the mechanical properties. Although lower gloss values could be achieved by adding greater amounts of the matting agent, the mechanical properties of the cured material, e.g. of a corresponding surface-coating, are adversely affected as a result.

"It has, however, now been found, surprisingly, that the use of waxes for the matting of cured material based on the thermally curable systems described above can be substantially or even completely dispensed with by using the afore-mentioned metal salts and/or metal complexes (component a) that have a matting action, which are known per se, together with a polymerisation product (component b) having a molecular weight of preferably more than 1500, especially more than 2000 (Mn=number average; gel permeation chromatography ("GPC") using polystyrene calibration), the monomers on which the polymerisation product is based including."

It has furthermore been found that matting agents of that kind also exhibit comparable gloss reduction in thermally curable systems that comprise, as cross-linking agents, glycidyl ester compounds having a molecular weight of up to and including 1500, there being obtained, irrespective of the amount of matting agent added, cured materials, for example corresponding surface-coatings, having good mechanical properties, when the amount of component (b) of the matting agent contained in the agent is such that an excess of epoxy equivalents is present in relation to the metal equivalents of component (a) and preferably when component (b) comprises a polymerisation product having an epoxy value of at least 1.5, preferably from 1.5 to 8, equivalents of epoxy groups per kilogram, and when the ratio of epoxy equivalents of component (b) to metal equivalents of component (a) is at least 3.0, preferably at least 3.5. In particular, increasing amounts of this novel matting agent do not cause attenuation of the mechanical properties of the cured material matted therewith.

Moreover, the matting agents according to the invention do not need to comprise any wax or, compared to known wax-containing matting agents, may comprise a substantially reduced amount of wax, with better matting efficiency being achieved, surprisingly, in spite of a reduced amount of wax.

The present invention accordingly relates to a matting agent in the form of a solid mixture having a matting action, for the production of matt surfaces, as described hereinafter and as defined in the claims.

The present invention relates especially to a matting agent for thermally curable systems that comprise at least one carboxyl-containing polymer as binder and at least one epoxy-group-containing compound as hardener or cross-linking agent, e.g. for corresponding powder coating compositions, wherein the matting agent comprises at least the following constituents:

(a) a metal salt or a metal complex of an organic compound, the metal being selected from the group magnesium, calcium, strontium, barium, zinc, aluminium, tin and antimony, and (b) a polymerisation product of monomers, the monomers including epoxy-group-containing monomers and the epoxy value of the polymerisation product being at least 0.1, preferably from 0.1 to 8, especially from 1 to 8, equivalents of epoxy groups per kilogram, and overall the ratio of epoxy equivalents of component (b) to metal equivalents of component (a) being from 0.2 to 120, preferably from 0.4 to 30.

The invention furthermore includes a particular embodiment of the said matting agent which, especially advantageously, is suitable also as a matting agent for thermally curable systems that comprise, as cross-linking agents, glycidyl ester compounds having a molecular weight of up to and including 1500. In that particular matting agent, component (b) is a polymerisation product of monomers that has an epoxy value of at least 1.5, preferably from 1.5 to 8, equivalents of epoxy groups per kilogram, and overall the ratio of epoxy equivalents of component (b) to metal equivalents of component (a) is at least 3, preferably at least 3.5.

Matting agents according to the invention wherein component (b) is a polymerisation product of monomers that has an epoxy value of from 0.1 to 1.5 (exclusive) equivalents of epoxy groups per kilogram and/or wherein overall the ratio of epoxy equivalents of component (b) to metal equivalents of component (a) is from 0.1 to 3 (exclusive) are, accordingly, generally not advantageous for thermally curable systems in which the cross-linking agent consists of glycidyl esters having a molecular weight of up to and including 1500 or contains a predominant amount of such glycidyl esters.

The present invention relates also to the use of the matting agents according to the invention for the corresponding thermally curable systems, especially in corresponding surface-coating compositions, preferably powder coating compositions.

The present invention relates especially to the use of the matting agent according to the invention in powder coating compositions that comprise at least one carboxyl-containing polymer, preferably a carboxyl-terminated polyester or a carboxyl-containing (meth)acrylate polymer, as binder and at least one epoxy-group-containing compound or a mixture of an epoxy-group-containing compound and a hydroxyalkylamide compound as hardener or cross-linking agent and, optionally, an accelerator for the cross-linking reaction of the hardener with the carboxyl-containing polymer and also further additives that are customary per se, and also to cured material, for example a powder surface-coating, that has been cured in the presence of a matting agent according to the invention.

The present invention further relates to corresponding thermally curable systems and thermally curable compositions, especially surface-coating compositions, preferably powder coating compositions, that comprise a matting agent according to the invention.

Suitable metal salts and metal complexes of an organic compound, that is to say suitable component (a) constituents, are preferably salts and complexes of magnesium, calcium, aluminium or zinc, preferably of zinc, the metal more especially being divalent or having a higher valency, for example being di- to penta-valent.

The organic moiety of those metal salts and metal complexes is preferably derived from ($C_6$–$C_{32}$)carboxylic acids, especially mono- and di-carboxylic acids, or derivatives of such acids, preferably ($C_6$–$C_{13}$)monocarboxylic acids or derivatives of such acids, ($C_6$–$C_{13}$)alkylphenols or ($C_6$–$C_{22}$) alkylnaphthols (wherein the expression "($C_6$–$C_{13}$)alkyl" can indicate the sum of the carbon atoms of a plurality of alkyl substituents), ($C_5$–$C_{12}$)-1,3-diketones and sulfur-containing organic radicals. Preference is given to sulfur-containing organic radicals.

The monocarboxylic acids are preferably natural fatty acids, which may be saturated, mono- or poly-unsaturated and/or substituted. Suitable saturated fatty acids are, for example, caprylic acid, capric acid, lauric acid, myristic acid, palmitic acid and, especially, stearic acid. Suitable unsaturated acids are, for example, palmitoleic acid (9-hexadecenoic acid), oleic acid (9-octadecenoic acid), linoleic acid (9,12-octadecadienoic acid) and linolenic acid (9,12,15-octadecatrienoic acid). Substituents in substituted fatty acids may be alkyl, cycloalkyl, hydroxy and/or keto groups.

Suitable fatty acid derivatives are, for example, dimers and oligomers, especially of unsaturated fatty acids, that is to say, compounds comprising two or more carboxyl groups per molecule.

The rings of ($C_6$–$C_{13}$)alkylphenols and ($C_6$–$C_{13}$) alkylnaphthols may be substituted, for example by one or more ($C_1$–$C_3$)alkyl groups, by one or more fluorinated ($C_1$–$C_3$)alkyl groups, by one or more halogen atoms or by one or more nitro groups. As ($C_5$–$C_{12}$)-1,3-diketone there may be used, for example, acetylacetone.

Preferred sulfur-containing compounds are thiols, thiophenols, disulfides and derivatives of thiourea and of thiocarbamic acid. Examples of sulfur-containing compounds are N,N-dimethyldithiocarbamic acid, bis(N,N-dimethylthiocarbamoyl)disulfide, dibenzyl disulfide, N,N'-diisopropylthiourea, 2-benzothiazolyl-N,N-diethylthiocarbamoyl sulfide, 2-benzothiazolethiol (2-mercaptobenzothiazole), tert-dodecylmercaptan (mixture of 2,4,4,6,6-pentamethylheptanethiol and 2,2,4,6,6-pentamethylheptanethiol) and pentachlorothiophenol.

Preferred metal compounds for use as component (a) are aluminium or magnesium stearate, aluminium or zinc acetylacetonate, zinc methacrylate, zinc arachidate, zinc pentachlorothiophenolate and zinc 2-benzothiazole thiolate (zinc mercaptobenzothiazole). Special preference is given to zinc 2-benzothiazole thiolate.

Polymerisation products for use as component (b) are, especially, glycidyl (meth)acrylate homopolymers and glycidyl. (meth)acrylate copolymers, where appropriate having different molecular weights and/or based on different comonomers, or a mixture of such compounds. Various polymers and copolymers of that kind are already known and described, for example, in EP 0 480 120, EP 0 551 064, U.S. Pat. No. 5,648,117, U.S. Pat. No. 4,051,194 and U.S. Pat. No. 4,499,239. Examples of such polymers include, inter alia, the Almatex series of Mitsui Toatsu Chemical Inc. (Almatex PD 6100, PD 6200, PD 6300, PD 7110, PD 7210, PD 7310, PD 7690), the Fine-Clad series of Reichold Chemicals Inc. (Fine-Clad A-257, A-254, A-253, A-249-A, A-244-A, A-229-30-A) and Finedic A-229 and Finedic A-244 of Dainippon Ink and Chemicals Inc. Component (b) preferably includes one or more polymers containing glycidyl ester groups and, optionally, glycidyl ether groups and having an average molecular weight (Mn=number average from GPC measurement using polystyrene calibration) of from 1000 to 30 000, especially polyglycidyl ester polymers and copolymers, such as polyglycidyl (meth)acrylate polymers, and polyglycidyl (meth)acrylate copolymers with vinyl derivatives and/or further (meth)acrylic acid derivatives as comonomers. Special preference is given to polyglycidyl (meth)acrylate polymers or polyglycidyl (meth)acrylate copolymers having average molecular weights (Mn) in the range from 1000 to 30 000, preferably from 2000 to 15 000, for example from 5000 to 12 000. It is also possible for two or more different glycidyl-containing polymers and/or copolymers such as those mentioned above to be used together.

Analogously to the afore-mentioned glycidyl compounds, epoxy-group-containing compounds for use as component (b) include the corresponding β-methylglycidyl compounds, for example β-methylglycidyl (meth)acrylate homopolymers and copolymers having different molecular weights and based on different comonomers. Such β-methylglycidyl (meth)acrylate compounds are known per se and described, for example, in U.S. Pat. No. 4,051,194 or in U.S. Pat. No. 3,989,767.

According to the invention, the polymers for use as component (b) have a relatively low average molecular weight so that their melt viscosities are within a range that is suitable for use of the powder coating composition, which normally means that the average molecular weights (Mn) are preferably in the range from 1000 to 30 000, especially from 2000 to 15 000, for example in the range from 5000 to 12 000; the glass transition temperature (Tg; determined using DSC at a heating rate of 5° C./min) is preferably in the range from 20° C. to 120° C., especially from 40° C. to 100° C. The desired average molecular weights can be obtained by the methods conventional in polymer chemistry, for example by varying the amount of initiator, varying the polymerisation temperature or by adding polymerisation regulators or chain transfer agents. Suitable preparation methods are the conventional methods of polymer chemistry, for example polymerisation in solution, where appropriate followed by precipitation, precipitation polymerisation, bulk polymerisation at an elevated temperature, suspension polymerisation or emulsion polymerisation with subsequent isolation of the solid polymerisation product, for example by spray-drying or coagulation.

Polyglycidyl esters and ethers can also be prepared by reacting alkyl epihalohydrins with polycarboxylic acids or polyols, as described, for example, in EP 0 750 025 or U.S. Pat. No. 5,844,048, or by means of known grafting reactions in accordance with CA 1 290 482, J. of Polymer Science: Part A: Polymer Chemistry, Vol. 37, 105–112 (1999) or J. of Applied Polymer Science, Vol. 67, 1957–1963, 1998.

Optionally, the matting agent according to the invention may additionally comprise (c) a natural or synthetic wax or wax-like substance.

Waxes and wax-like substances of the kind that may optionally be used as additional component (c) of the matting agents according to the invention are also known per se. They may be, for example, waxes and/or wax-like substances of natural, for example vegetable, animal or mineral, origin or waxes and wax-like substances of synthetic origin. The waxes and wax-like substances have a melting point of preferably at least S0° C., especially at least 80° C.

Natural waxes are, for example, montan wax, camauba wax, beeswax, shellac wax, paraffin wax, ceresin or japan wax.

Synthetic waxes are preferably reaction products of long-chain ($C_{14}$–$C_{36}$)alcohols, preferably of ($C_{16}$–$C_{22}$)alcohols, for example reaction products of cetyl alcohol and/or palmityl alcohol, with acids, such as stearic acid, palmitic acid and/or myristic acid, and also glycerides, glycol esters or polyethylene glycol esters of fatty acids, for example stearic acid, synthetic beeswax, aliphatic amine waxes, obtained, for example, by reacting hydrogenated castor oil with monethanolamine, and also high-molecular-weight aliphatic amides. Special preference is given to polyamide waxes, fluorinated polyolefin waxes, fatty acid ester waxes, beeswax and, especially, unsubstituted polyolefin waxes.

The ratio of the epoxy equivalents of component (b) to the metal equivalents of component (a) is preferably in the range from 0.4 to 30 when the matting agent is to be used for glycidyl-ester-free thermally curable systems as described in this Application and from 3.5 to 30, especially in the range from 4 to 20, when it is intended for the purpose of matting thermally curable systems that comprise, as cross-linking agents, glycidyl ester compounds having a molecular weight of at most 1500.

When component (c) is used, the amount by weight thereof is preferably from 5%, especially 10%, up to a maximum of 30% by weight, based on the total weight of components (a), (b) and (c); addition of the wax component (c) surprisingly has an additional effect generally, namely that the matted material, in the fully cured state, exhibits better mechanical properties than if it did not comprise the wax.

The matting agents according to the invention may also comprise, in amounts customary for the particular application, further customary additives, preferably fillers, light stabilizers, dyes, pigments, degassing agents, adhesive agents, thixotropic agents and flow agents.

The described matting agents according to the invention are used in thermally curable systems or compositions, especially in surface-coating compositions, preferably in powder coating compositions, that comprise at least one carboxyl-containing polymer, especially a carboxyl-terminated polyester and/or a carboxyl-containing acrylic resin, as binder and one or more epoxy-group-containing compounds or a mixture of an epoxy-group-containing compound and a hydroxyalkylamide compound as hardener or cross-linking agent, and, optionally, an accelerator (catalyst) for acceleration of the cross-linking reaction, as already described hereinbefore.

For use of the matting agent according to the invention, components (a) and (b) thereof, and also component (c), which may be optionally present in addition, are added—mixed or not mixed—to the curable system or curable composition. The mixture obtained in that manner can then be processed under conventional conditions to form the finished matted mixture, for example the powder coating composition. It is, however, also possible first to process components (a) and (b), optionally together with component (c), separately to form a homogeneous matting mixture, for example by heating them together to a temperature of preferably at most 120° C., especially from 80 to 100° C., and melting them, for example in an extruder or in a stirring vessel, and comminuting the resulting homogeneous mixture (extrudate), preferably to an average particle size in the range from 0.015 μm to 1000 μm, especially from 5 μm to 500 μm. The matting mixture obtained thereby is then added to the curable composition. It is likewise also possible to add any of the three components (a), (b) or (c) separately to the curable formulation.

In the development of a curable (surface-coating) system matted in accordance with the invention and optimised with respect to its composition, it is advantageous first to optimise the curable system without the addition of the matting agent according to the invention. The matting agent according to the invention can be added to the optimised system afterwards. After curing there is accordingly obtained a cured system, for example in the form of a thin layer having a matted surface, in which the other physical or mechanical properties of the cured system are unaffected or affected only slightly.

The matting agent according to the invention is added preferably in an amount of up to 20% by weight, especially in an amount of from 1 to 10% by weight, based on the total weight of binders and hardener in the curable composition, the said amounts including components (a), (b) and (c) of the matting agent, but not any of the additives used, for example pigments etc.

Carboxyl-group-containing polyester polymers that are suitable as binders for thermally curable systems according to the invention have an acid number (quoted in mg of KOH/g of polyester) of preferably from 10 to 100, especially from 10 to 35, and a molecular weight (number average Mn) of from 1500 to 10 000. The ratio of Mw (weight average molecular weight) to Mn of those polyesters is generally from 2 to 10. The polyesters are advantageously solid at room temperature and have a glass transition temperature of preferably from 35 to 120° C., especially from 40 to 80° C. They are preferably condensation products of polyols with dicarboxylic acids and, optionally, polyfunctional carboxylic acids, or the corresponding carboxylic acid anhydrides. Suitable polyols are, for example, ethylene glycol, diethylene glycol, the propylene glycols, butylene glycols, 1,3-butanediol, 1,4-butanediol, neopentyl glycol, isopentyl glycol, 1,6-hexanediol, glycerol, hexanetriol, trimethylolethane, trimethylolpropane, erythritol, pentaerythritol, cyclohexanediol and 1,4-dimethylolcyclohexane. Suitable dicarboxylic acids are, for example, isophthalic acid, terephthalic acid, phthalic acid, methylphthalic acids, tetrahydrophthalic acid, hexahydrophthalic acid, methyltetrahydrophthalic acids, e.g. 4-methyltetrahydrophthalic acid, cyclohexanedicarboxylic acids, succinic acid, glutaric acid, adipic acid, pimelic acid, suberic acid, azelaic acid, sebacic acid, dodecanedicarboxylic acid, fumaric acid, maleic acid and 4,4'-diphenyldicarboxylic acid. Suitable tricarboxylic acids are, for example, aliphatic tricarboxylic acids and anhydrides thereof, such as 1,2,3-propanetricarboxylic acid (tricarballylic acid), aromatic tricarboxylic acids, such as trimesic add, trimellitic acid (benzene-1,2,4-tricarboxylic acid) and hemimellitic acid (benzene-1,2,3-tricarboxylic acid), and cycloaliphatic tricarboxylic acids, such as 6-methylcydohex-4-ene-1,2,3-tricarboxylic acid. Suitable tetracarboxylic acids include, for example, pyromellitic acid and pyromellitic acid anhydride, and benzophenone-3,3',4, 4'-tetracarboxylic acid and benzophenone-3,3',4,4'-tetracarboxylic acid anhydride.

Commercially available polyesters are frequently based on neopentyl glycol and/or trimethylolpropane as the main alcohol constituents and on adipic acid and/or terephthalic acid and/or isophthalic acid and/or trimellitic acid as the main acid components.

The thermally curable systems for use with the matting agents according to the invention preferably comprise, as carboxyl-containing (meth)acrylate polymer, an acrylate polymer or a methacrylate polymer, especially a copolymer of one or more acrylates and/or methacrylates, especially the corresponding alkyl esters having from 1 to 18, preferably from 1.5 to 8, carbon atoms in the alkyl group, with acrylic add and/or methacrylic acid and, optionally, further ethylenically unsaturated comonomers, for example styrene, that polymer having, for example, a molecular weight (number average Mn from GPC measurement using polystyrene calibration) of from 500 to 30 000, preferably from 1000 to 10 000. Furthermore, the polymer preferably contains from 0.2 to 6 equivalents of free carboxyl groups. The glass transition temperature of such acrylate polymers and methacrylate polymers is preferably above 20° C. and especially in the range from 30° C. to 100° C. Examples of suitable acrylate and methacrylate monomers are ethyl acrylate, butyl acrylate, 2-ethylhexyl acrylate and, especially, ($C_1$–$C_4$)alkyl methacrylates, such as methyl methacrylate, ethyl methacrylate and butyl methacrylate. Acrylate and methacrylate derivatives that contain silane groups can also be used. Suitable ethylenically unsaturated comonomers are, for example, acrylo- or methacrylo-nitriles and vinyl compounds. Preferred comonomers are vinyl aromatic compounds, especially styrene. The afore-mentioned polymers can be prepared in known manner, for example by polymerisation of the monomers dissolved in suitable organic solvents, especially in toluene or in mixtures of 1-methoxy-2-propanol, 1-methoxy-2-propyl acetate and methyl isobutyl ketone (for example, in a ratio by weight of 70/20/10), in the presence of a suitable initiator, for example dicumyl peroxide, and of a chain transfer reagent, for example thioglycolic acid. They can also be subjected to bulk polymerisation.

In addition to the binder described hereinbefore, the curable system comprises at least one epoxy compound having a cross-linking action (hardener). Preference is given to epoxy compounds having a cross-linking action that contain at least two 1,2-epoxy groups in the molecule and can also be termed "(a) polyepoxy compound(s)". For the purposes of the present Application, the term "epoxy compounds" also includes epoxidised oils, which can be, for example, the epoxidation products of soybean oil, linseed oil, perilla oil, tung oil, oiticica oil, safflower oil, poppy oil, hemp oil, cottonseed oil, sunflower oil, rapeseed oil, high-oleic triglycerides, triglycerides from Euphorbia plants, groundnut oil, olive oil, olive kernel oil, almond oil, kapok oil, hazelnut oil, apricot kernel oil, beechnut oil, lupin oil, corn oil, sesame oil, grapeseed oil, Lallemantia oil, castor oil, herring oil, sardine oil, menhaden oil, whale oil, tall oil, and derivatives thereof, which will be known to the person skilled in the art.

It is generally possible for a selection suitable for the purpose in question to be made from the known epoxy compounds.

The epoxy compounds having a cross-linking action may be, for example, polymeric epoxy compounds, e.g. advanced epoxy resins, such as the reaction products of phenolic di- and poly-glycidyl ethers with less than a stoichiometric amount of at least one compound having two functional groups that are reactive with epoxy groups, for example phenolic hydroxyl groups or carboxyl groups. Frequently, for example, a derivative of diglycidyl ether of bisphenol is advanced with a bisphenol derivative, e.g. diglycidyl ether of bisphenol A is advanced with bisphenol A. In curable mixtures of that kind, especially when they are surface-coating compositions, for example powder coating compositions, the carboxyl-group-containing binder and the polymeric epoxy resin are present overall in one of the ratios by weight 70±5 to 30±5, 60±5 to 40±5, 50±5 to 50±5, 40±5 to 60±5 or 30±5 to 70±5 (70/30, 60/40, 50/50 hybrid systems etc.).

Moreover, for the present invention, it is also possible to use, as epoxy hardeners, glycidyl compounds of relatively low molecular weight. A known example of such hardeners is triglycidyl isocyanurate (TGIC).

Other glycidyl compounds of relatively low molecular weight that are suitable as cross-linking agents or hardeners are described, for example, in EP-A-0 297 030, EP-A-0 356 391, EP-A-0 462 053, EP-A-0 506 617 and EP-A-0 536 085. The suitable glycidyl compounds include compounds that contain unsubstituted glycidyl groups and/or glycidyl groups substituted by methyl groups. The glycidyl compounds advantageously have a molecular weight of at most 1 500, preferably from 200 to 1200, especially from 200 to 1000, and may be solid or liquid. Their epoxy value is preferably at least three equivalents per kilogram of the compound, preferably at least four equivalents per kilogram and especially at least five equivalents per kilogram. Preference is given to glycidyl compounds having glycidyl ether and/or glycidyl ester groups. For the purpose in question, it is also possible for a glycidyl compound to contain both kinds of glycidyl group, for example 4-glycidyloxy-benzoic acid glycidyl ester.

Preference is given to polyglycidyl esters having from two to four glycidyl ester groups, especially diglycidyl esters and/or triglycidyl esters and mixtures thereof.

The preferred diglycidyl esters are derived preferably from aromatic, araliphatic, cycloaliphatic, heterocyclic, heterocyclic-aliphatic or heterocyclic-aromatic dicarboxylic adds having from 6 to 20, especially from 6 to 12, ring carbon atoms or from aliphatic dicarboxylic acids having from 2 to 10 carbon atoms. Compounds of that kind are generally known and are also described, for example, in U.S. Pat. No. 3,859,314 and in DE-A-31 26 411. Examples of suitable dicarboxylic acids are phthalic add, isophthalic acid, terephthalic acid, 2,5-dimethylphthalic acid, 5-tert-butyl-isophthalic add, naphthalene-2,6-dicarboxylic acid, naphthalene-1,8-dicarboxylic acid, naphthalene-2,3-dicarboxylic acid, diphenyl ether 4,4'-dicarboxylic acid, diphenyl-2,2'-dicarboxylic acid, tetrachlorophthalic acid, 2,5-dichlorophthalic acid, ortho-, meta- or para-phenylenediacetic add, oxalic acid, malonic acid, succinic acid, adipic acid, 2,2,4-trimethyladipic acid, 2,4,4-trimethyladipic acid, sebacic acid, azelaic acid, fumaric acid, maleic acid and the dicarboxylic acids obtainable by the addition of acrylonitrile or an acrylate to compounds having activatable hydrogen atoms, for example ketones, nitrogen compounds, diols or dithiols, tetrahydrophthalic acid, methyltetrahydrophthalic acid, hexahydrophthalic acid, methylhexahydrophthalic acid, endomethylene-hexahydrophthalic acid, hexahydroterephthalic acid, especially trans-hexahydroterephthalic acid, hexahydroisophthalic acid, thiophene-2,5-dicarboxylic acid, furan-2,5-dicarboxylic acid, furan-3,4-dicarboxylic acid, pyrazine-3,4-dicarboxylic acid, 1,3-bis(carboxyethyl)hydantoin unsubstituted or alkyl-substituted in the 5-position, 1,1-methylene-bis[3-(p-glycidyloxycarbonylbenzyl)-5,5-dimethylhydantoin] and other dicarboxylic acid esters containing one or more hydantoin rings and N,N'-bis(p-glycidyloxycarbonylbenzoyl)-isophoronediamine.

Especially preferred diglycidyl esters are diglycidyl terephthalate, diglycidyl isophthalate, diglycidyl 1,4-hexahydrophthalate and diglycidyl oxalate, diglycidyl adipate, diglycidyl sebacate, diglycidyl azelate and diglycidyl succinate.

Especially preferred glycidyl esters having at least three glycidyl groups per molecule are, for example, triglycidyl trimellitate, triglycidyl trimesate and tetraglycidyl pyromellitate.

Further preferred glycidyl compounds and combinations thereof are described, for example, in P.-G. Gottis, J.-A. Cotting, FATIPEC Congress (1996), $23^{rd}$ (Vol.B), 8216–8231 (ISSN:0430–222), "Solid solutions of glycidyl compounds as TGIC alternatives in polyester powder coatings". A hardener to which very special preference is given is a mixture of a diglycidyl compound and a triglycidyl compound, for example a mixture of diglycidyl terephthalate and triglycidyl trimellitate or a mixture of the corresponding partially or completely hydrogenated derivatives of the said esters, those compounds preferably being used in a ratio by weight of diglycidyl compound to triglycidyl compound of from 10:1 to 1:10, and preferably approximately from 3:1 to 1:1.

The glycidyl compounds can also be mixed with compounds that contain cyclocarbonate groups. Special preference is given to a combination of tris(2-oxo-1,3-dioxolanyl-4-methyl) isocyanurate with the said mixture of a diglycidyl compound and a triglycidyl compound. According to the invention it is possible to use hydroxyalkylamides, especially β-hydroxyalkylamides, in admixture with epoxy compounds, as hardeners, in which case the hydroxyalkylamide is advantageously present in a lesser amount compared with the epoxy compounds, for example less than 50%, preferably less than 30%, by weight, based on the total hardener of the curable composition according to the invention. The use of hydroxyalkylamides as hardeners or cross-linking agents in powder coating compositions based on carboxyl-containing polymers, preferably carboxyl-terminated polyesters and/or carboxyl-containing (meth)acrylate polymers, is known per se. Suitable hydroxyalkylamides are described, for example, in U.S. Pat. No. 4,801,680 and in U.S. Pat. No. 5,847,057. Preference is given to, for example, the compounds bis(N,N'-di(5-hydroxyethyl)adipamide and bis(N,N'-di(β-hydroxypropyl)adipamide.

It can be advantageous to add an accelerator which catalyses the cross-linking reaction of the hardener with carboxyl-containing polymers, provided that the accelerator does not adversely affect the matting effect. Suitable accelerators for the cross-linking of epoxy compounds with the carboxyl-containing binder polymers are, for example, conventional phosphorus-containing accelerators or a masterbatch thereof, for example ethyltriphenylphosphonium bromide. Certain accelerators, for example some nitrogen-containing compounds, may, however, exert an adverse effect on the matting of the curable composition. In that connection, the person skilled in the art should bear in mind that many commercially sold carboxyl-group-containing binders and epoxy compounds already comprise a proportion of accelerator compounds and therefore may be less suitable for the purposes of the present invention if the accelerator concerned is of an unsuitable kind. The binder or hardener should, in that instance, be replaced by corresponding non-accelerated components. The accelerator or catalyst or a catalyst mixture is advantageously added in an amount of approximately from 0.01 to 2%, especially from 0.05 to 1% by weight of active accelerator compound, based on the total weight of the curable composition. The addition of an accelerator is mainly a question of system optimisation, which is not a problem for the person skilled in the art.

Special preference is given to a matting agent according to the invention in the form of a solid mixture having a matting action, which matting agent is suitable for the matting of the said thermally curable systems, especially for the production of matt powder coating composition surfaces, wherein the said matting agent comprises at least the following constituents:

(a) a zinc salt or a zinc complex of an organic compound, preferably a zinc salt of mercaptobenzothiazole, and (b) a polymerisation product of monomers, the monomers including epoxy-group-containing monomers and the epoxy value of the polymerisation product being from 0.1 to 8, preferably from 1 to 8, equivalents of epoxy groups per kilogram, preferably a corresponding glycidyl (meth)acrylate polymer or copolymer having a molecular weight (Mn) preferably in the range from 2000 to 15 000, and (c) optionally, a polyolefin wax, preferably a polyethylene wax having a melting range from 50° C., especially from 90° C., to 120° C. (measured by DSC at a heating rate of 5° C./min), the ratio of epoxy equivalents of component (b) to metal equivalents of component (a) overall being from 0.2 to 120, preferably from 0.4 to 30.

When the matting agent having components (a), (b) and, optionally, (c) is to be used specifically for the matting of thermally curable systems that comprise glycidyl ester compounds having a maximum molecular weight of 1500 as cross-linking agents, it is advantageous when component (b) thereof is a polymerisation product of monomers that include epoxy-group-containing monomers that has an epoxy value of from 1.5 to 8 equivalents of epoxy groups per kilogram, preferably a corresponding glycidyl (meth)acrylate polymer or copolymer having a molecular weight (Mn) preferably in the range from 2000 to 15 000, wherein overall the ratio of epoxy equivalents of component (b) to metal equivalents of component (a) is from 3.5 to 30.

The curable compositions comprising a matting agent according to the invention may, of course, comprise further customary additives, for example fillers, preferably silicic acid, talc, mica and/or chalk, especially Aerosil, light stabilizers, dyes, pigments, for example titanium dioxide, degassing agents, for example benzoin, adhesive agents, thixotropic agents and/or flow agents. The curable compositions according to the invention may also comprise a suitable inert solvent or solvent mixture, for example a xylene, butyl acetate, isobutanol, 1-methoxy-2-propanol, 1-methoxy-2-propyl acetate or methyl isobutyl ketone (MIBK).

The curable compositions comprising a matting agent according to the invention can be used in the areas of technology customary for curable epoxy resin compositions, especially for surface-coating compositions, preferably for powder coating compositions. The compositions may be prepared in any customary manner.

Corresponding powder coating compositions can be prepared, for example, by simply mixing together the constituents, for example in a ball mill. Another, more preferred possibility comprises melting together, blending and homogenising the constituents, preferably in an extruder, for example a Buss co-kneader, and cooling and comminuting the mass. The powder coating composition mixtures preferably have an average particle size in the range from 0.015 μm to 500 μm, especially from 5 μm to 100 μm.

The thermally curable systems and compositions according to the invention, for example corresponding coatings, such as (powder) surface-coatings, are, depending on the application, applied in a manner known per se to the article to be coated, and cured at a temperature of at least 100° C., preferably from 150° C. to 250° C. The curing generally takes approximately from 5 to 60 minutes. Any material that is stable at the temperatures required for the curing, especially metals and ceramics, is suitable for coating. Especially when using polyesters that comprise as structural units 50% by weight, especially 90% by weight or more, neopentanediol and aromatic or cycloaliphatic dicarboxylic adds, especially terephthalic acid, and that are commercially available, for example as Crylcoat® types (UCB) or under names such as Uralac® (DSM), Alftalat® (Vianova) or Grilesta® (EMS), the coatings obtained are resistant to weathering, are suitable for external finishes and are especially flexible, that applying both to sudden and to persistent mechanical loading.

EXAMPLES

General Remarks Relating to Examples 1 to 3

The free-radical polymerisation of monomeric glycidyl methacrylate (GMA) is carried out using α,α'-azo-isobutyronitrile (AIBN) as polymerisation initiator and, in Example 1, additionally using allyl glycidyl ether. By selecting the amount of initiator, where applicable the amount of allyl glycidyl ether, and the polymerisation temperature, the desired relatively low molecular weight (Mw or Mn) is achieved. In the polymerisation process used herein, a major portion of the monomer mixture (90%), the full amount of initiator and a portion of the solvent are metered in, within a period of 2 hours, to an initial charge in the reactor consisting of the remaining monomer mixture (10%) and the remainder of the solvent, which allows good control of the polymerisation exotherm and contributes to the fact that the desired molecular weight is obtained in reproducible manner. Of course, many variants of the reaction procedure are possible; the person skilled in the art will find that it is simple to determine the suitable conditions.

Example 1

Preparation of a Glycidyl Methacrylate (GMA) Homopolymer Having a Low Mn, Using Allyl Glycidyl Ether The polymerisation apparatus consists of a heatable 3000 ml double-walled jacket reactor equipped with a stirrer, reflux condenser, thermometer, nitrogen purging means, feed receptacle and feed pump ("Masterflex" peristaltic pump). A monomer mixture consisting of 1300.5 g of glycidyl methacrylate and 144.5 g of allyl glycidyl ether is prepared. The reactor is charged with 144.5 g of the monomer mixture and 867.0 g of methoxypropyl acetate (MPA, solvent). The feed receptacle is filled with the remaining monomer mixture (1300.5 g), 96.5 g of MPA and 72.25 g of AIBN, the AIBN having been homogeneously dissolved. The entire apparatus (including the feed receptacle) is purged with nitrogen, the reactor is heated to an internal temperature of 100° C. (jacket temperature of 105° C.) and the feed is then started. The rate of feed is so selected that the feed takes about 2 hours. The stirring speed is 100 rpm. After the feed, polymerisation is continued for a further 2 hours at 100° C. under nitrogen. The viscous solution is precipitated in hexane and the solvent is decanted off. The greasy residue is dissolved in acetone and precipitated in water. The precipitated residue is re-precipitated once more from acetone/water. The solid polymer is filtered off and dried in vacuo. 1200.0 g of colourless polymer in powder form, having the following analytical data, remain:

$T_g$ (measured by DSC): 31° C.

GPC (polystyrene calibration): Mw=7147; Mn=2986

Epoxy value, titrimetric: 6.44 equivalents/kg

Example 2

Preparation of a GMA Homopolymer Having a Low Mn, without Allyl Glycidyl Ether

The polymerisation apparatus consists of a 1 liter plane-ground flask, provided with an anchor stirrer together with stirring motor, reflux condenser, temperature sensor, nitrogen purging means, two feed receptacles and two feed pumps ("Masterflex" peristaltic pump). The plane-ground flask is charged with a solution of 24 g of glycidyl methacrylate (GMA) in 144 g of 1-methoxy-2-propanol (MP). A solution of 12 g of AIBN in 240 g of MP is prepared, filtered and added to the first feed receptacle. The second feed receptacle is filled with 216 g of GMA. The entire apparatus (including the feed receptacles) is purged with nitrogen, and the reaction flask is heated to an internal temperature of 100° C. (jacket temperature: 105° C.). When an internal temperature of 80° C. is reached, the feed of the AIBN solution and of GMA from the two feed receptacles is started, with stirring, the rate of feed in each case being 2 ml/min. The total reaction time is 4 hours. The viscous solution is precipitated in 5 liters of deionised water that has been cooled to 5° C., is filtered off and is subsequently washed with 1 liter of deionised water. The solid polymer is dried in vacuo at 35° C. 233 g of colourless polymer in powder form, having the following analytical data, remain:

$T_g$ (measured by DSC): 60° C.

GPC (polystyrene calibration): Mw=10 000; Mn=3423

Epoxy value, titrimetric: 6.98 equivalents/kg

Example 3

Preparation of a GMA Homopolymer Having a Low Mn, without Allyl Glycidyl Ether

The plane-ground flask, equipped analogously to Example 2, is charged with a solution of 15 g of glycidyl methacrylate (GMA) in 100 g of 1-methoxy-2-propanol (MP). A solution of 9 g of AIBN in 10 g of propylene glycol monomethyl ether acetate is prepared, filtered and added to the first feed receptacle. The second feed receptacle is filled with 135 g of GMA. The entire apparatus (including the feed receptacles) is purged with nitrogen, and the reaction flask is heated to an internal temperature of 110° C. (jacket temperature: 115° C.). When an internal temperature of 90° C. is reached, the feed of the AIBN solution and of GMA from the two feed receptacles is started, with stirring, the rate of feed in each case being 3 ml/min. The total reaction time is 3 hours. The viscous solution is precipitated in 3.5 liters of deionised water that has been cooled to 5° C., is filtered off and is subsequently washed with 0.8 liter of deionised water. The solid polymer is dried in vacuo at 35° C. 146 g of colourless polymer in powder form, having the following analytical data, remain:

$T_g$ (measured by DSC): 46° C.

GPC (polystyrene calibration): Mw=5830; Mn 2862

Epoxy value, titrimetric: 6.81 equivalents/kg

Example 4

Preparation of a Mixture of Vestowax H2, Zinc Salt of Mercaptobenzothiazole, and GMA Homopolymer from Example 1

70 g of GMA homopolymer from Example 1, 13 g of mercaptobenzothiazole zinc salt and 28 g of Vestowax H2® are intimately mixed and homogenised at 80° C. in a twin screw extruder (Prism TSE 16 PC) (single extrusion). The cooled extrudate is broken up and then ground (Retsch ZM 1000 ultracentrifugal mill). The resulting fine powder is then sieved using a standard sieve having a mesh size of <100 μm.

Example 5

Preparation of a Mixture of Vestowax H2, Zinc Salt of Mercaptobenzothiazole, and GMA Homopolymer from Example 2

70 g of GMA homopolymer from Example 2, 13 g of mercaptobenzothiazole zinc salt and 28 g of Vestowax are homogenised in accordance with the procedure set out in Example 4.

Example 6

Preparation of a Wax-Free Mixture from GMA Copolymer and Zinc Salt of Mercaptobenzothiazole 86.6 g of GMA-300 (Estron Chemical) and 13.4 g of mercaptobenzothiazole zinc salt are homogenised in accordance with the procedure set out in Example 4.

The substances set out in Tables 1, 3, 5, 7, 9 and 11 are mixed together, in the amounts mentioned in each case, and homogenised at 90° C. in a twin screw extruder (Prism TSE 16 PC). The cooled extrudate is broken up and then ground (Retsch ZM 1000 ultracentrifugal mill). The resulting fine powder is sieved using a standard sieve having a mesh size of <100 μm. The gel time is measured in accordance with ISO standard 8130. The powder coating composition is sprayed onto test sheets (Q panels) electrostatically. Stoving conditions, layer thicknesses and results are set out in Tables 2, 4, 6, 8, 10 and 12.

Example 7

Application of the Matting Agents Prepared in Examples 4 and 5.

TABLE 1

(Ref. = Comparison Example)
Thermally curable system comprising a carboxyl-terminated polyester and also diglycidyl terephthalate (DGT) and triglycidyl trimellitate (TML) (DGT:TML = 3:1). Use of the mixtures from Examples 4 and 5 (Examples A, B and C). Wax content of the mixtures: 25% by weight.

|  | Ref. 1 | Ref. 2 | Ref. 3 | Ref. 4 | Ref. 5 | A | B | C |
|---|---|---|---|---|---|---|---|---|
|  | Parts by weight, in grams | | | | | | | |
| Polyester, Alftalat ® 9952 | 93 | 93 | 93 | 93 | 93 | 93 | 93 | 93 |
| DGT/TML 3:1 | 7 | 7 | 7 | 7 | 7 | 7 | 6.2 | 7 |
| Modarez MFP-V-P | 2.1 | 2.1 | 2.1 | 2.1 | 2.1 | 2.1 | 2.1 | 2.1 |
| Benzoin | 0.4 | 0.4 | 0.4 | 0.4 | 0.4 | 0.4 | 0.4 | 0.4 |
| Curing accelerator DT 3126 | 0.9 | | | 0.9 | | | | |
| $TiO_2$ (Kronos 2310) | 51.7 | 51.7 | 51.7 | 51.7 | 51.7 | 51.7 | 51.7 | 51.7 |
| zinc 2-benzothiazale thiolate | | 0.8 | | | 0.8 | | | |
| Poly-GMA from Example 1 | | | 3.8 | | | | | |
| Vestowax H2 | | | | 5.3 | 5.2 | | | |
| Mixture, Example 4 | | | | | | 6 | 6 | |
| Mixture, Example 5 | | | | | | | | 6 |
| Gel time 180° C.(s) | 255 | 180 | 85 | 215 | 180 | 55 | 55 | 65 |

Alftalat ® 9952 polyester of VIANOVA resins, acid number: 23–29 mg KOH/g Polyester.
Modarez MFP-V-P = flow additive from Protex-Chemie, Basle, based on polyacrylates
Accelerator DT 3126 = masterbatch consisting of a polyester and a tetraalkylammonium compound
Extruder    Prism Twin Screw
Temperature    T = 90° C.
Rpm    250
Mill    Retsch ZM 1000, 1 mm
Sieve    100 μm

TABLE 2

|  | Ref. 1 | Ref. 2 | Ref. 3 | Ref. 4 | Ref. 5 | A | B | C |
|---|---|---|---|---|---|---|---|---|
| Layer thickness (μm) | 65 | 55 | 65 | 71 | 60 | 65 | 60 | 60 |
| Stoving | 200° C. 15 min | 200° C. 15 min | 200° C. 15 min | 200° C. 15 min | 200° C. 15 min | 200° C. 15 min | 200° C. 15 min | 200° C. 15 min |
| Gloss (angle) 20° | 88 | 75 | 84 | 44 | 24 | 23 | 18 | 20 |
| Gloss (angle) 60° | 95 | 92 | 93 | 68 | 55 | 67 | 61 | 64 |
| Yellowness value (according to DIN 6167) | 2.1 | −0.2 | 0.2 | 1.4 | 0.5 | 0.5 | 0.4 | 0.1 |
| Cupping test according to Erichsen (Erichsen indentation)* (mm) | >10 | >10 | 10.7 | >10 | 7 | >10 | >10 | >10 |
| Reverse impact deformation** | >160 | <20 | >80 | >160 | <20 | >160 | >160 | >160 |
| Acetone test***, 1 min | 3 | 5 | 3 | 3 | 4 | 2–3 | 2–3 | 3 |

*Erichsen indentation DIN 53 156
**Reverse impact deformation (kg · cm)
***Acetone test, rating: 0(zero) = after test duration of 1 minute, film is intact; rating 5 = after test duration of 1 minute, film has swollen as far down as the underlying material
Substrate for all surface-coatings: Q panels

TABLE 3

(Glycidyl-ester-free thermally curable system based on TGIC)

|  | Ref. 6 | D |
|---|---|---|
|  | Parts by weight, in grams | |
| Polyester, Uralac ® P2400 | 93 | 93 |
| Triglycidyl isocyanurate (TGIC) | 7 | 7 |
| Modarez MFP-V-P | 1 | 1 |
| Benzoin | 0.2 | 0.2 |
| TiO$_2$ (Kronos 2310) | 50 | 50 |
| zinc 2-benzothiazole thiolate | 0.5 | |
| Vestowax H2 | 3 | |
| Mixture, Example 4 | | 3.5 |
| Gel time 180° C.(s) | 125 | 50 |

Uralac ® P2400 polyester of DMS Resins, acid number 32–38 mg KOH/g Polyester.
Extruder   Prism Twin Screw
Temperature   T = 90° C.
Rpm   250
Mill   Retsch ZM 1000, 1 mm
Sieve   100 μm

TABLE 4

|  | Ref. 6 | D |
|---|---|---|
| Layer thickness (μm) | 60 | 60 |
| Stoving | 200° C. | 200° C. |
|  | 15 min | 15 min |
| Gloss (angle) 20° | 30 | 21 |
| Gloss (angle) 60° | 70 | 67 |
| Yellowness value (according to DIN 6167) | 0.4 | −0.2 |
| Cupping test according to Erichsen (Erichsen indentation)* (mm) | >10 | >10 |
| Impact deformation** (kg · cm) | >160 | >160 |
| Acetone test***, 1 min | 2 | 2 |

*, , *, see Table 2 for explanation

Example 8

TABLE 5

Wax-free semi-matt formulations comprising a carboxyl-terminated polyester and diglycidyl terephthalate (DGT) and triglycidyl trimellitate (TML) (DGT:TML = 3:1).

|  | E | F | G | H | I | Ref. 7 | Ref. 8 | Ref. 9 |
|---|---|---|---|---|---|---|---|---|
|  | Parts by weight, in grams | | | | | | | |
| Polyester, Alftalat ® 9952 | 93 | 93 | 93 | 93 | 93 | 93 | 93 | 93 |
| DGT/TML 3:1 | 7 | 7 | 7 | 7 | 7 | 7 | 7 | 7 |
| Modarez MFP-V-P | 2.1 | 2.1 | 2.1 | 2.1 | 2.1 | 2.1 | 2.1 | 2.1 |
| Benzoin | 0.4 | 0.4 | 0.4 | 0.4 | 0.4 | 0.4 | 0.4 | 0.4 |
| TiO$_2$ (Kronos 2310) | 51.7 | | 51.7 | 51.7 | 51.7 | 51.7 | 51.7 | 51.7 |
| TiO$_2$ (Kronos 2160) | | 51.7 | | | | | | |
| zinc 2-benzothiazole thiolate | 0.7 | 0.7 | 0.7 | 0.7 | 0.7 | — | 0.7 | 0.7 |
| Poly-GMA from Ex. 3 (epoxy value 6.81 eq/kg) | 3.8 | 3.8 | | | | | | |
| Almatex PD 7690 (epoxy value 2.02 eq/kg) | | | 3.8 | | | | | |
| Almatex PD 6300 (epoxy value 1.93 eq/kg) | | | | 3.8 | | | | |
| GMA 300 ™ (epoxy value 3.27 eq/kg) | | | | | 3.8 | 3.8 | | |
| Almatex PD 6200 (epoxy value 1.42 eq/kg) | | | | | | | 3.8 | 7.8 |
| Gel time 180° C.(s) | 115 | 95 | 175 | 125 | 140 | 65 | >900 | 90 |

The matting agent systems according to Reference Examples Ref. 8 and Ref. 9 have, overall, a ratio of epoxy equivalents of component (b) to metal equivalents of component (a) of 3.1 and 6.3, respectively.
GMA 300 ™ and Almatex PD 7690, Almatex PD 6300, Almatex PD 6200 are copolymers of glycidyl (meth)acrylate and non-epoxy-containing monomers (Estron Chemicals, Inc. and Mitsui Toatsu Chemicals, Inc.).
Extruder   Prism Twin Screw
Temperature   T = 90° C.
Rpm   250
Mill   Retsch ZM 1000, 1 mm
Sieve   100 μm

TABLE 6

|  | E | F | G | H | I | Ref. 7 | Ref. 8 | Ref. 9 |
|---|---|---|---|---|---|---|---|---|
| Layer thickness (μm) | 76 | 77 | 66 | 66 | 61 | 60 | 65 | 60 |
| Stoving | 200° C. | 200° C. | 200° C. | 200° C. | 200° C. | 200° C. | 200° C. | 200° C. |
|  | 15 min | 15 min | 15 min | 15 min | 15 min | 15 min | 15 min | 15 min |
| Gloss (angle) 20° | 28 | 25 | 27 | 27 | 35 | 79 | 91 | 35 |
| Gloss (angle) 60° | 67 | 69 | 73 | 72 | 77 | 94 | 95 | 80 |
| Yellowness value (according to DIN 6167) | 1.6 | 1.3 | 2.2 | 0.6 | −0.1 | 0.1 | −0.3 | 0.0 |
| Cupping test according to | >10 | >10 | >10 | >10 | >10 | 10.1 | <1 | 7.7 |

TABLE 6-continued

|  | E | F | G | H | I | Ref. 7 | Ref. 8 | Ref. 9 |
|---|---|---|---|---|---|---|---|---|
| Erichsen (Erichsen indentation)* (mm) |  |  |  |  |  |  |  |  |
| Impact deformation** (kg · cm) | 140 | >160 | >160 | >160 | >160 | >160 | <5 | <20 |
| Acetone test***, 1 min | 2 | 2 | 3 | 3 | 2 | 3 | 3 | 4 |

*, , *, see Table 2 for explanation

Example 9

TABLE 7

Semi-matt formulations comprising a carboxyl-terminated polyester and also diglycidyl terephthalate (DGT) and triglycidyl trimellitate (TML) (DGT:TML = 3:1). Use of the mixture from Example 6. Slow polyesters are accelerated and, depending on the grade of TiO₂, small amounts of wax are used.

|  | L | M | N | Ref. 10 | Ref. 11 |
|---|---|---|---|---|---|
|  | Parts by weight, in grams ||||||
| Polyester, Alftalat ® 9952 | 93 | 93 |  | 93 |  |
| Polyester, Uralac ® P3489 |  |  | 93 |  | 93 |
| DGT/TML 3:1 | 7 | 7 | 7 | 7 | 7 |
| Modarez MFP-V-P | 2.1 | 2.1 | 2.1 | 2.1 | 2.1 |
| Benzoin | 0.4 | 0.4 | 0.4 | 0.4 | 0.4 |
| TiO₂ (Kronos 2310) | 51.7 |  |  |  |  |
| TiO₂ (Kronos 2160) |  | 51.7 | 51.7 | 51.7 | 51.7 |
| Additol VXL 9890* |  |  | 3.9 |  |  |
| Polyethylene wax** |  | 0.7 |  |  |  |
| Mixture, Example 6 | 5.2 | 4.5 | 5.2 | 5.2 | 5.2 |
| Gel time 180° C.(s) | 110 | 100 | 90 | 115 | 155 |

Uralac ® P3489 polyester of DSM Resins, acid number 25–30 mg KOH/g Polyester.
*Accelerator Additol VXL 9890 (Vianova Resins) = masterbatch consisting of a polyester and a phosphonium bromide compound
**e.g. Ceraflour 990 (Byk-Chemie)

TABLE 8

|  | L | M | N | Ref. 10 | Ref. 11 |
|---|---|---|---|---|---|
| Layer thickness (μm) | 55 | 60 | 55 | 50 | 55 |
| Stoving | 200° C. 15 min | 200° C. 15 min | 200° C. 15 min | 200° C. 15 min | 200° C. 15 min |
| Gloss (angle) 20° | 17 | 16 | 28 | 33 | 47 |
| Gloss (angle) 60° | 65 | 60 | 74 | 77 | 83 |
| Yellowness value (according to DIN 6167) | -2.1 | -0.6 | 0.0 | -0.5 | 0.0 |
| Cupping test according to Erichsen (Erichsen indentation)* (mm) | >10 | >10 | >10 | 10 | 7.2 |
| Impact deformation** (kg · cm) | >160 | >160 | >160 | <20 | <20 |
| Acetone test***, 1 min | 3 | 3 | 3 | 3 | 3 |

*, , *, see Table 2 for explanation

Example 10

TABLE 9

Formulations comprising a carboxyl-terminated polyester and also diglycidyl terephthalate (DGT) and triglycidyl trimellitate (TML) (DGT:TML = 3:1) combined with Primid XL 552. Use of the mixture from Example 6. Slow polyesters are accelerated and, depending on the grade of TiO₂, small amounts of wax are used.

|  | O | Ref. 12 | Ref. 13 |
|---|---|---|---|
|  | Parts by weight, in grams |||
| Polyester, Alftalat ® 9952 | 94 | 95 |  |
| Grilesta P7630 |  |  | 95 |
| Primid XL 552 | 1 | 2 | 5 |
| DGT/TML 3:1 | 5 | 3 |  |
| Modarez MFP-V-P | 2.1 | 2.1 | 2.1 |
| Benzoin | 0.4 | 0.4 | 0.4 |
| TiO₂ (Kronos 2310) | 52.2 | 52.8 | 52.8 |
| Mixture, Example 6 | 5.2 | 5.3 | 5.3 |
| Gel time 180° C.(s) | 110 | 105 | 170 |

Primid XL 552 (Ems-Chemie)
Grilesta P7630 Polyester ex. Ems-Chemie, Acid number 31–36 mg KOH/g Polyester

TABLE 10

|  | O | Ref. 12 | Ref. 13 |
|---|---|---|---|
| Layer thickness (μm) | 60 | 60 | 50 |
| Stoving | 200° C. 15 min | 200° C. 15 min | 200° C. 15 min |
| Gloss (angle) 20° | 51 | 73 | 75 |
| Gloss (angle) 60° | 85 | 91 | 92 |
| Yellowness value (according to DIN 6167) | 0.3 | -0.6 | 1.0 |
| Cupping test according to Erichsen (Erichsen indentation)* (mm) | >10 | >10 | >10 |
| Impact deformation** (kg · cm) | >160 | >160 | >160 |
| Acetone test***, 1 min | 3 | 3 | 3 |

*, , *, see Table 2 for explanation

Example 11

TABLE 11

Glycidyl-ester-free thermally curable systems comprising a carboxyl-terminated polyester and also polymeric epoxy resins (50/50 hybrid system). Use of the mixture from Example 6.

|  | P | Q | R | S | T |
|---|---|---|---|---|---|
|  | Parts by weight, in grams |||||
| Araldite GT 7004 | 45 | 45 | 45 | 45 | 45 |
| Araldite GT 3032 | 5 | 5 | 5 | 5 | 5 |
| Polyester, Uralac ® P2127 | 50 | 50 |  |  |  |
| Polyester, Alftalat ® AN 722 |  |  | 50 | 50 | 50 |
| Benzoin | 0.2 | 0.2 | 0.2 | 0.2 | 0.2 |
| TiO₂ R-KB-2 | 50 | 50 | 50 | 50 | 50 |
| Mercaptobenzothiazole zinc salt |  |  |  | 0.7 | 0.7 |
| Almatex PD 6200 |  |  |  | 2.3 | 3.8 |

TABLE 11-continued

Glycidyl-ester-free thermally curable systems comprising a carboxyl-terminated polyester and also polymeric epoxy resins (50/50 hybrid system). Use of the mixture from Example 6.

|  | P | Q | R | S | T |
|---|---|---|---|---|---|
|  | Parts by weight, in grams | | | | |
| (epoxy value 1.42 eq/kg) | | | | | |
| Mixture, Example 6 | 4.5 | 5.5 | 5.5 | | |
| Gel time 180° C.(s) | 145 | 125 | 200 | 320 | 300 |

Araldite GT 7004, Araldite GT 3032 Epoxy resins from Ciba Specialty Chemicals based on Bisphenol A, Epoxy value 1.33–1.40 eq./kg
Alftalat ® AN 722 Polyester from VIANOVA Resins, Acid number 55–65 mg KOH/g Polyester
Uralac ® P2127 Polyester from DSM Resins, Acid number 70–85 mg KOH/g Polyester TiO$_2$ R-KB-2 from Bayer

TABLE 12

|  | P | Q | R | S | T |
|---|---|---|---|---|---|
| Layer thickness (μm) | 60 | 50 | 60 | 60 | 60 |
| Stoving | 200° C. | 200° C. | 200° C. | 200° C. | 200° C. |
|  | 15 min | 15 min | 15 min | 15 min | 15 min |
| Gloss (angle) 20° | 8 | 7 | 5 | 9 | 8 |
| Gloss (angle) 60° | 38 | 37 | 29 | 42 | 37 |
| Yellowness value | 1.7 | 0.8 | 2.4 | 1.5 | 1.8 |
| (according to DIN 6167) | | | | | |
| Cupping test according to Erichsen (Erichsen indentation)* (mm) | 9.0 | 8.7 | 9.2 | 9.8 | 9.5 |
| Impact deformation** (kg · cm) | >160 | 160 | 160 | >160 | >160 |
| Acetone test***, 1 min | 2 | 2 | 2 | 2 | 3 |

*, , *, see Table 2 for explanation

What is claimed is:

1. A thermally curable system comprising:
   (a) a binder comprising at least one carboxyl-containing polymer;
   (b) a cross-linking agent comprising at least one epoxy-group-containing compound; and
   (c) a matting agent comprising:
      (i) a metal salt or a metal complex of an organic compound, the metal being selected from the group consisting of magnesium, calcium, strontium, barium, zinc, aluminium, tin and antimony;
      (ii) a polymerisation product of epoxy-group containing monomers, wherein the epoxy value of the polymerisation product is from 1 to 8 equivalents of epoxy groups per kilogram;
   wherein the overall ratio of epoxy equivalents of component (b) to metal equivalents of component (a) is from 0.2 to 120; and
      (iii) optionally, a natural or synthetic wax.

2. The thermally curable system of claim 1, wherein the carboxyl-containing polymer is a carboxyl-terminated polyester and/or a carboxyl-containing (meth)acrylate polymer.

3. The thermally curable system of claim 1, wherein the matting agent is present in an amount of up to 20% by weight based on the total weight of binder and cross-linking agent in the system.

4. The thermally curable system of claim 1, wherein the matting agent is present in an amount of from 1% to 10% by weight based on the total weight of binder and cross-linking agent in the system.

5. The thermally curable system of claim 1, wherein the cross-linking agent does not contain any glycidyl esters that have a molecular weight of up to and including 1500.

6. The thermally curable system of claim 1, wherein the epoxy-group containing compound is a mixture of a diglycidyl compound and a triglycidyl compound.

7. The thermally curable system of claim 6, wherein the carboxyl-containing polymer is a carboxyl-terminated polyester and/or a carboxyl-containing (meth)acrylate polymer.

8. The thermally curable system of claim 6, wherein the diglycidyl compound and triglycidyl compound are present in a ratio by weight of from 10:1 to 1:10.

9. A thermally curable system, comprising:
   (a) a binder comprising at least one carboxyl-containing polymer;
   (b) a cross-linking agent comprising at least one epoxy-group-containing compound; and
   (c) a matting agent comprising:
      (i) a metal salt or a metal complex of an organic compound, the metal being selected from the group consisting of magnesium, calcium, strontium, barium, zinc, aluminium, tin and antimony;
      (ii) a polymerisation product of epoxy-group containing monomers, wherein the epoxy value of the polymerisation product is at least 1.5 equivalents of epoxy groups per kilogram; and
   wherein the overall ratio of epoxy equivalents of component (b) to metal equivalents of component (a) is at least 3.0; and
      (iii) optionally, a natural or synthetic wax.

10. The thermally curable system of claim 9, wherein the polymerisation product of the matting agent has an epoxy value of from 1.5 to 8 equivalents of epoxy groups per kilogram, and the overall ratio of epoxy equivalents of the polymerisation product to metal equivalents of the metal salt or metal complex is at least 3.5.

11. The thermally curable system of claim 9 or claim 10, wherein the cross-linking agent comprises a glycidyl ester compound having a molecular weight of up to and including 1500.

12. The thermally curable system of claim 9 or claim 10, wherein the cross-linking agent consists of glycidyl esters having a molecular weight of up to and including 1500, or contains a predominant amount of such glycidyl esters.

13. The thermally curable system of claim 9 or claim 10, wherein the epoxy-group-containing compound is a mixture of a diglycidyl compound and a triglycidyl compound.

14. The thermally curable system of claim 9 or claim 10, wherein the diglycidyl compound and triglycidyl compound are present in a ratio by weight of from 10:1 to 1:10.

15. The thermally curable system of claim 9 or claim 10, wherein the mixture of a diglycidyl compound and a triglycidyl compound is a mixture of diglycidyl terephthalate and triglycidyl trimellitate.

16. The thermally curable system of claim 1 or 9, wherein constituent (iii) is present in an amount of from 5% to 30% by weight based on the total weight of the matting agent.

17. The thermally curable system of claim 1 or 9, wherein constituent (iii) is present in an amount of from 10% to 30% by weight based on the total weight of the matting agent.

18. The thermally curable system of claim 1 or 9, characterized by the absence of any wax.

19. A fully cured system according to either of claims 1 or 9.

20. A process for coating an article, comprising the steps of applying a thermally curable system according to either of claims 1 or 9 to said article, and curing the system at a temperature of at least 100° C.

21. The process of claim 20, wherein the temperature is in the range from 150° C. to 250° C.

22. A matting agent for thermally curable systems, characterized in that said systems comprise at least one carboxyl-containing polymer as binder and at least one epoxy-group-containing compound as cross-linking agent, wherein said matting agent comprises:

(a) a metal salt or a metal complex of an organic compound, the metal being selected from the group consisting of magnesium, calcium, strontium, barium, zinc, aluminium, tin and antimony; and (b) a polymerisation product of epoxy-group-containing monomers selected from the group consisting of glycidyl (meth)acrylate homopolymers, glycidyl (meth)acrylate copolymers, and mixtures of such compounds; wherein the epoxy value of the polymerisation product is from 1 to 8 equivalents of epoxy groups per kilogram; and wherein the overall ratio of epoxy equivalents of component (b) to metal equivalents of component (a) is from 0.2 to 120.

23. A matting agent for thermally curable systems, characterized in that said systems comprise at least one carboxyl-containing polymer as binder and at least one epoxy-group-containing compound as cross-linking agent, wherein said matting agent comprises:

(a) a metal salt or a metal complex of an organic compound, the metal being selected from the group consisting of magnesium, calcium, strontium, barium, zinc, aluminium, tin and antimony; and (b) a polymerisation product of epoxy-group-containing monomers selected from the group consisting of glycidyl (meth)acrylate homopolymers, glycidyl (meth)acrylate copolymers, and mixtures of such compounds; wherein the epoxy value of the polymerisation product is at least 1.5 equivalents of epoxy groups per kilogram; and wherein the overall ratio of epoxy equivalents of component (b) to metal equivalents of component (a) is at least 3.0.

24. The matting agent of claim 22 or 23, wherein constituent (b) includes one or more polyglycidyl (meth)acrylate polymers or copolymers having an average molecular weight (Mn) in the range from 1,000 to 30,000.

25. The matting agent of claim 24, wherein the average molecular weight (Mn) is in the range from 2,000 to 15,000.

26. The matting agent of claim 22, wherein said matting agent is in the form of a solid mixture, constituent (a) is a zinc salt or a zinc complex of an organic compound; constituent (b) is a glycidyl (meth)acrylate polymer or copolymer; and the matting agent optionally comprises a polyolefin wax or a polyethylene wax having a melting point in the range from 50° C. to 120° C.

27. The matting agent of claim 26, wherein the glycidyl (meth)acrylate polymer or copolymer has a molecular weight (Mn) in the range of 2,000 to 15,000.

28. The matting agent of claim 26, wherein constituent (a) is a zinc salt of mercaptobenzothiazole; constituent (b) is a glycidyl (meth)acrylate polymer or copolymer having a molecular weight (Mn) in the range from 2,000 to 15,000; and further comprising a polyethylene wax having a melting point in the range from 50° C. to 120° C.

* * * * *